(No Model.)
J. M. BURDICK.
COMBINED MOWER AND TEDDER.
No. 285,792. Patented Oct. 2, 1883.
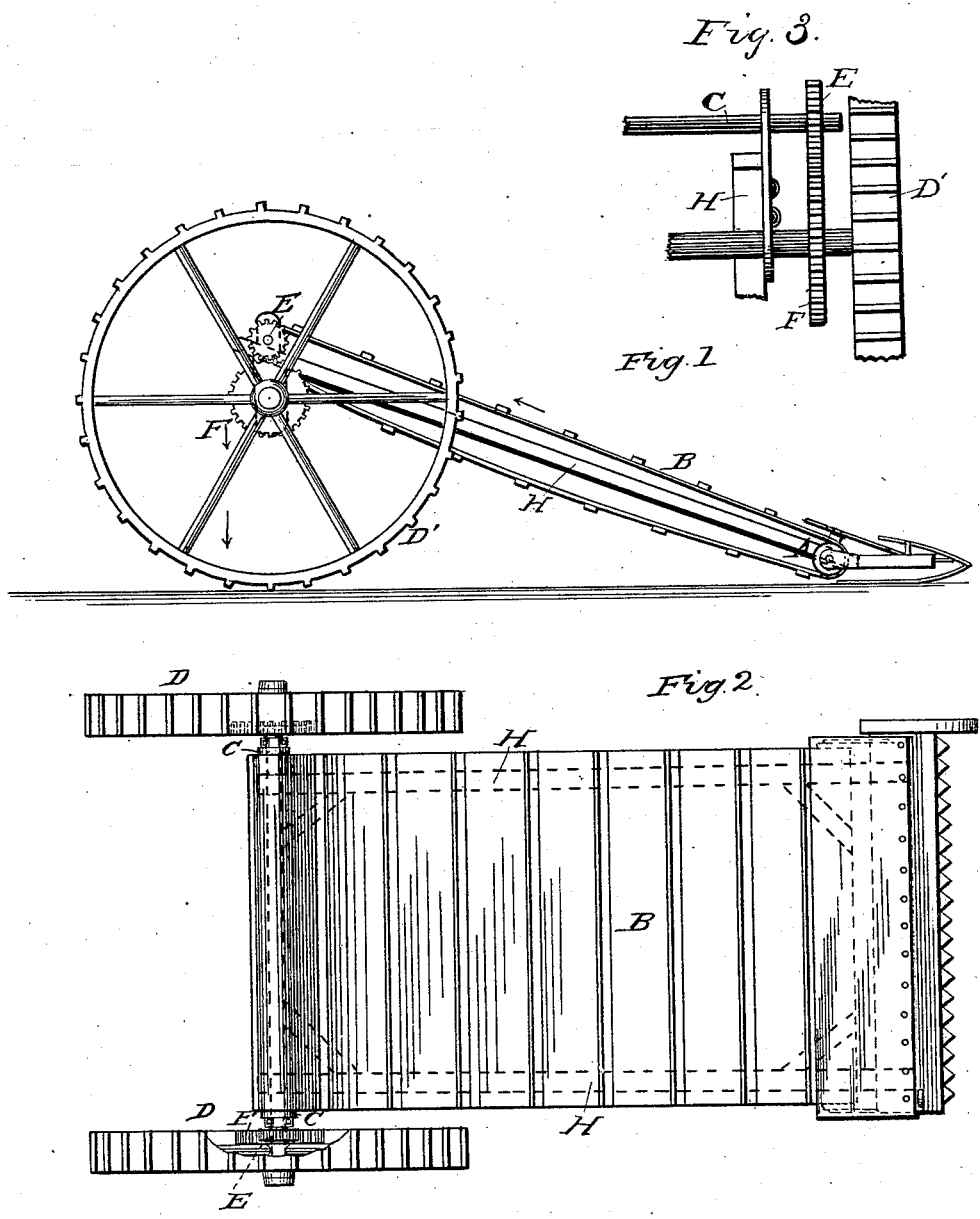
WITNESSES:
INVENTOR.
James M. Burdick
By Daniel Breed ATTORNEY.

UNITED STATES PATENT OFFICE.

JAMES M. BURDICK, OF ILION, NEW YORK.

COMBINED MOWER AND TEDDER.

SPECIFICATION forming part of Letters Patent No. 285,792, dated October 2, 1883.

Application filed November 25, 1882. (No model.)

*To all whom it may concern:*

Be it known that I, JAMES M. BURDICK, a citizen of the United States, residing at Ilion, in the county of Herkimer and State of New York, have invented certain new and useful Improvements in Hay-Tedders; and I do hereby declare the following to be a full, clear, and exact description of the invention, such as will enable others skilled in the art to which it appertains to make and use the same.

This invention relates to a certain new and useful improvement in combined mower and hay-tedder, by which the cut grass is automatically elevated from the cutter-bar of a mower, and subsequently discharged so as to fall with the tops downward, thereby leaving the butts and undergrowth exposed to the sun and air; and to this end the invention consists in a novel combination and arrangement of parts, all as will be hereinafter fully described, and set forth in the claims hereto annexed.

Referring to the accompanying drawings, Figure 1 represents a side elevation of my improved hay-tedder connected with the finger-bar of a mower; Fig. 2, a top or plan view of the same; Fig. 3, an enlarged detached view of the gearing for actuating the roller.

My improvement is applicable to any of the common or general mowers now in use, a full description of which is not considered necessary.

In connection with the finger-bar of a mower a frame, H, is extended backward and upward, and the rear end is supported on the axle of a pair of high wheels, D D, or in any other suitable manner. Upon rollers A and C, at or near the ends of said frame H, is mounted an endless apron, B, receiving motion through the medium of the connecting gear-wheels F and E, mounted, respectively, on the main axle and the roller C, all as more clearly shown in detail in Fig. 3.

By the above-described combination and arrangement of parts it will be readily seen that the grass, when cut, will fall upon the endless apron and be carried backward and upward to a sufficient height to be discharged so as to fall with its tops downward, thus leaving the butts and undergrowth exposed to the sun and air.

I am aware that revolving aprons connected with the finger-bar of a mower for delivering grain from harvesters is old, and such I distinctly disclaim as of my invention.

Having thus fully described my invention, what I claim as new, and desire to secure by Letters Patent, is—

1. The combination, with the finger-bar and cutting apparatus of a mower, of a continuously-revolving endless apron inclined upward and backward, and its rear end arranged at such a height as to discharge the cut grass and permit it to fall tops downward, substantially as and for the purpose herein shown and described.

2. The combination, with the finger-bar and cutting apparatus of a mower, of the frame H, the continuously-revolving apron mounted on rollers A C, carried by said frame, the wheels and axle for supporting the rear end of the same, and connecting-gearing between the axle and roller C, by which the latter is rotated to operate the endless apron, substantially as and for the purpose herein shown and described.

In testimony whereof I affix my signature in presence of two witnesses.

JAMES M. BURDICK.

Witnesses:
DANIEL BREED,
W. C. DUVALL.